(12) United States Patent
Otsuka

(10) Patent No.: US 8,302,207 B2
(45) Date of Patent: Oct. 30, 2012

(54) COMPUTER READABLE MEDIUM FOR ACCESS RIGHT MANAGEMENT, ACCESS RIGHT MANAGEMENT APPARATUS AND DATA PROCESSING SYSTEM

(75) Inventor: Toru Otsuka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 309 days.

(21) Appl. No.: 12/854,208

(22) Filed: Aug. 11, 2010

(65) Prior Publication Data

US 2011/0185395 A1 Jul. 28, 2011

(30) Foreign Application Priority Data

Jan. 25, 2010 (JP) ................................ 2010-013122

(51) Int. Cl.
*G06F 7/04* (2006.01)
(52) U.S. Cl. ....................................................... 726/27
(58) Field of Classification Search .................. 726/1, 6, 726/27–30; 713/166, 193
See application file for complete search history.

(56) References Cited

U.S. PATENT DOCUMENTS

| | | | |
|---|---|---|---|
| 6,189,036 B1 * | 2/2001 | Kao | 709/229 |
| 6,993,131 B1 * | 1/2006 | Meyers | 380/201 |
| 7,155,745 B1 * | 12/2006 | Shin et al. | 726/27 |
| 7,168,088 B1 * | 1/2007 | Matena | 726/3 |
| 7,624,242 B2 * | 11/2009 | Savagaonkar et al. | 711/163 |
| 7,818,783 B2 * | 10/2010 | Davis | 726/2 |
| 7,992,198 B2 * | 8/2011 | Guarraci et al. | 726/9 |
| 8,037,538 B2 * | 10/2011 | Baba et al. | 726/27 |

FOREIGN PATENT DOCUMENTS

JP 2005-182478 A 7/2005
* cited by examiner

*Primary Examiner* — Beemnet Dada
(74) *Attorney, Agent, or Firm* — Sughrue Mion, PLLC

(57) ABSTRACT

A non-transitory computer readable medium for an access right management includes: reading correspondence information from a storage unit for storing correspondence information indicating the correspondence between (i) a unique access right of an access right in a data management unit for managing electronic data and the access right to the electronic data and (ii) a common access right of an access right in an interface providing unit intervening between an operation main body for giving an operation command to the electronic data and the data management unit; accepting a setting request for requesting setting of the common access right; and determining whether or not the setting request of the common access right accepted by the accepting is a non-match request.

9 Claims, 9 Drawing Sheets

COMPUTER READABLE MEDIUM FOR ACCESS RIGHT MANAGEMENT, ACCESS RIGHT MANAGEMENT APPARATUS AND DATA PROCESSING SYSTEM

CROSS-REFERENCE TO RELATED APPLICATION

This application is based on and claims priority under 35 USC 119 from Japanese Patent Application No. 2010-013122 filed on Jan. 25, 2010.

BACKGROUND

1. Technical Field

This invention relates to a computer readable medium for access right management, an access right management apparatus, and a data processing system.

2. Related Art

Hitherto, a document management system for managing objects (electronic data) of data of a document, a photo, a pattern, etc., created using a computer and a storage area of the data (for example, a folder) and the access right to the electronic data has been known. In an environment in which plural of document management systems are included, a document processing system is constructed using a component for providing an operation interface made common about different types of document management systems for an operation main body of an operator, a system, etc., for giving an object operation command. In the description to follow, the document management system is abbreviated as "DR" (Document Repository) and the component is abbreviated as "DRC" (Document Repository Connector) where appropriate.

FIG. 6 illustrates the relationship between DRC and its relevant component in the document processing system. In the example in FIG. 6, two of DR (1) and DR (2) are included as DR and the operation main body (DRC Client) for giving an operation command to each object managed in the DRs does not directly give a command to the target DR and indirectly gives a command through DRC.

"DRC API" is API (Application Programming Interface) defining a common operation interface independent of the type of DR, and "DRC SPI" is SPI (Service Provider Interface) defining an interface for each DR as a service provider; they are provided by DRC. "DR (1) API" and "DR (2) API" are APIs defining the functions provided in DR (1) and DR (2) respectively and are provided by DR (1) and DR (2). "DRC-Adapter For DR (1)" and "DRC-Adapter For DR (2)" are adapters for DRs implementing the function defined in "DRC API" using mapping of the access right and "DR (1) API" and "DR (2) API" for subcomponents implementing "DRC SPI."

In such a document processing system, the common access right systematized in DRC and the access right systemized uniquely in each DR do not necessarily match and thus the correspondence between the access right in DR and the access right in DRC is mapped.

FIG. 7 illustrates the correspondence between the access right in DRC and the access right in DR. In FIG. 7, version addition operation and deletion operation of an object are provided as operation provided in DRC and a model in which the version addition right is required for version addition operation in DRC and the deletion right is required for deletion operation in DRC is taken as an example.

In this case, to perform version addition operation of an object defined in DRC in DRC-Adapter For DR (1), version addition of the object is performed in DR (1). To perform version addition in DR (1), the management right in DR (1) is required and the version addition right of DRC is mapped in the management right of DR (1). Likewise, the deletion right of DR is also is mapped in the management right of DR (1). Plural of access rights of DRC mapped in one access right of DR like the relationship between the version addition right and the deletion right of DR mapped in the management right of DR (1) are referred to as the equivalent access right in the Specification.

If common access right is set in response to a request for setting common access right associated with unique access right from the user, it is feared that unique access right contrary to the user will become effective.

SUMMARY

According to an aspect of the invention, a non-transitory computer readable medium storing a program causing a computer to execute a process for an access right management includes:

reading correspondence information from a storage unit for storing correspondence information indicating the correspondence between (i) a unique access right of an access right in a data management unit for managing electronic data and the access right to the electronic data and (ii) a common access right of an access right in an interface providing unit intervening between an operation main body for giving an operation command to the electronic data and the data management unit, the common access right providing an operation interface made common about different types of the data management unit for the operation main body;

accepting a setting request for requesting setting of the common access right; and determining whether or not the setting request of the common access right accepted by the accepting is a non-match request wherein correspondence with a different common access right exists for the unique access right corresponding to that the common access right based on the correspondence information read by the reading.

BRIEF DESCRIPTION OF THE DRAWINGS

Exemplary embodiments of the invention will be described in detail based on the following figures, wherein.

DETAILED DESCRIPTION

Figure 8:
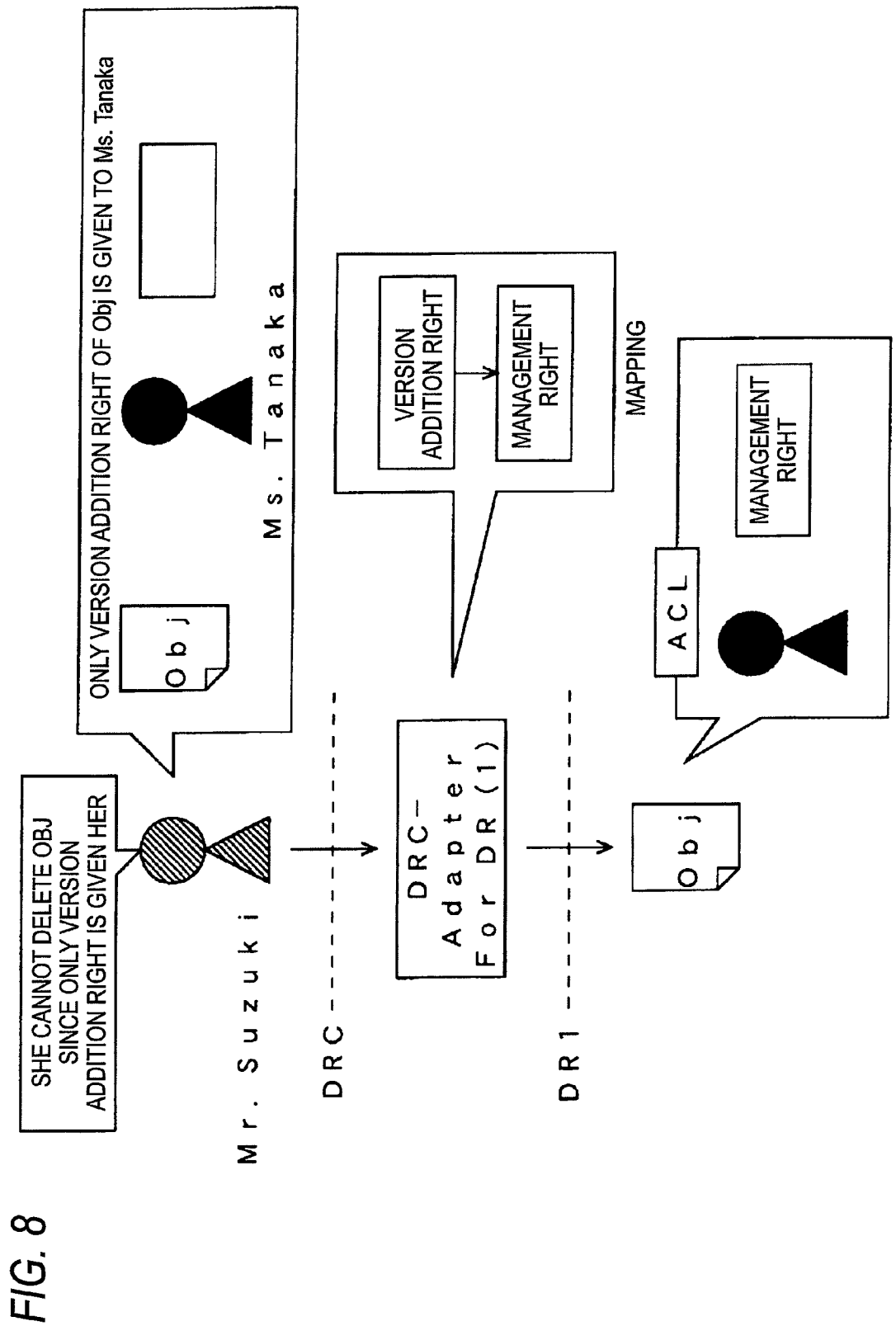
FIG. 8 is a drawing to describe access right setting in a related art.
Figure 9:
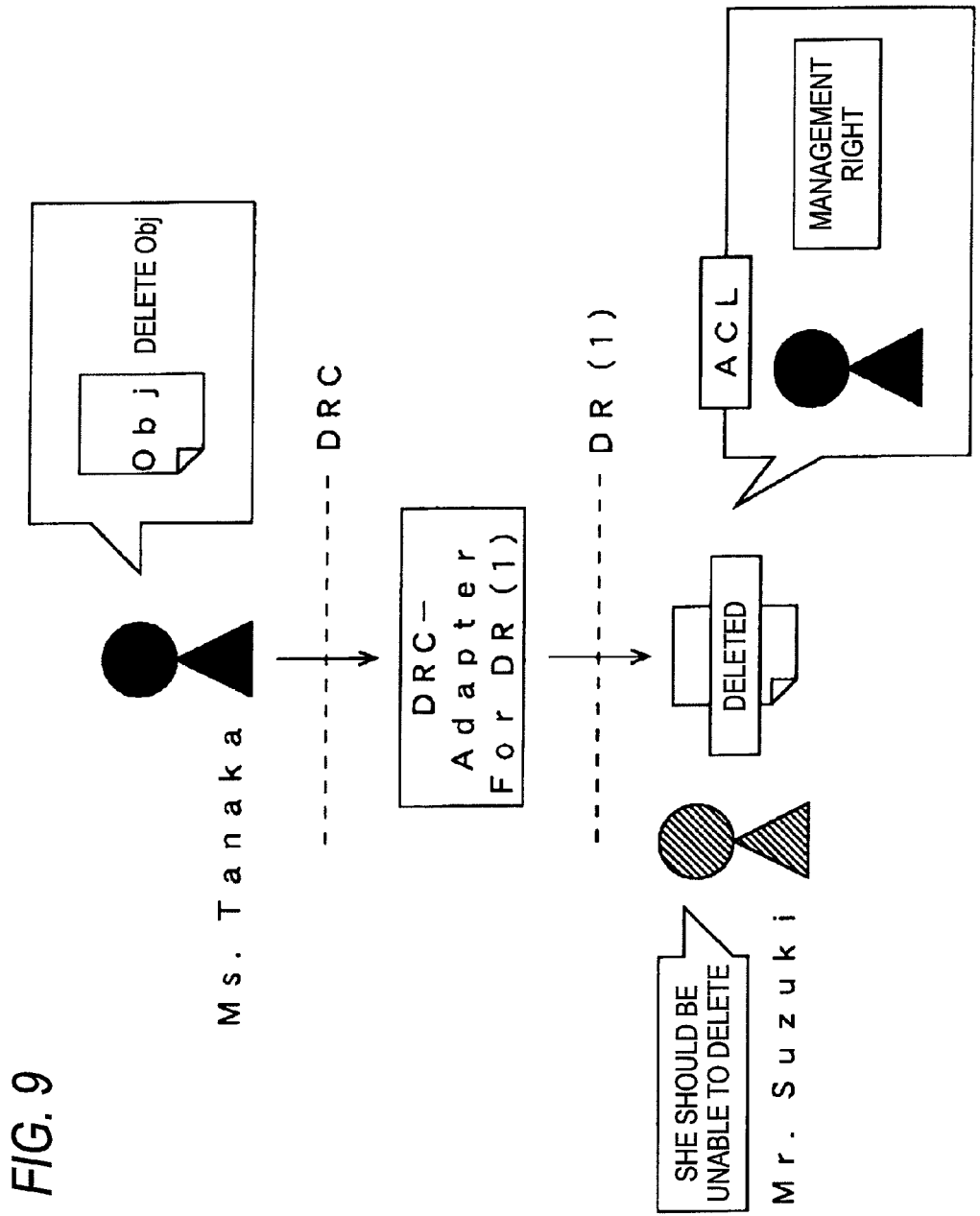
FIG. 9 is a drawing to describe access right setting in the related art.

Before the description of one exemplary embodiment of the invention, access right setting in DRC when the equivalent access right exists in a related art will be discussed with reference to FIGS. 8 and 9.

It is assumed that Mr. Suzuki recognizes that the version addition right of DRC is required to perform version addition of an object in DRC and the deletion right of DRC is required to delete an object in DRC and permits Ms. Tanaka to perform version addition of object obj, but does not want to permit Ms. Tanaka to delete object obj.

In this case, Mr. Suzuki issues a request for giving only the version addition right of object obj to Ms. Tanaka through DRC. However, in mapping for DR (1), the version addition right of DR is mapped in the management right of DR (1). Thus, upon reception of the set request of the version addition right of DR from Mr. Suzuki, DRC-Adapter For DR (1) sets access right control information (ALC: Access Control List) so that "Ms. Tanaka has the management right for object obj" for DR (1) (see FIG. 8).

The case where Ms. Tanaka deletes object obj through DRC in the situation is considered. As described above, Ms. Tanaka has the management right for making deletion operation possible in DR (1) and thus may delete object obj.

Thus, Mr. Suzuki gives only the version addition right of object obj to Ms. Tanaka through DRC and does not give the deletion right and thus does not think that Ms. Tanaka may delete object obj. However, since the version addition right and the deletion right are the equivalent access right, a contradiction situation in which actually the object may be deleted occurs.

Then, a data processing system according to one exemplary embodiment of the invention performs the following processing to realize suppressing occurrence of the above-described situation, etc.

Figure 1:
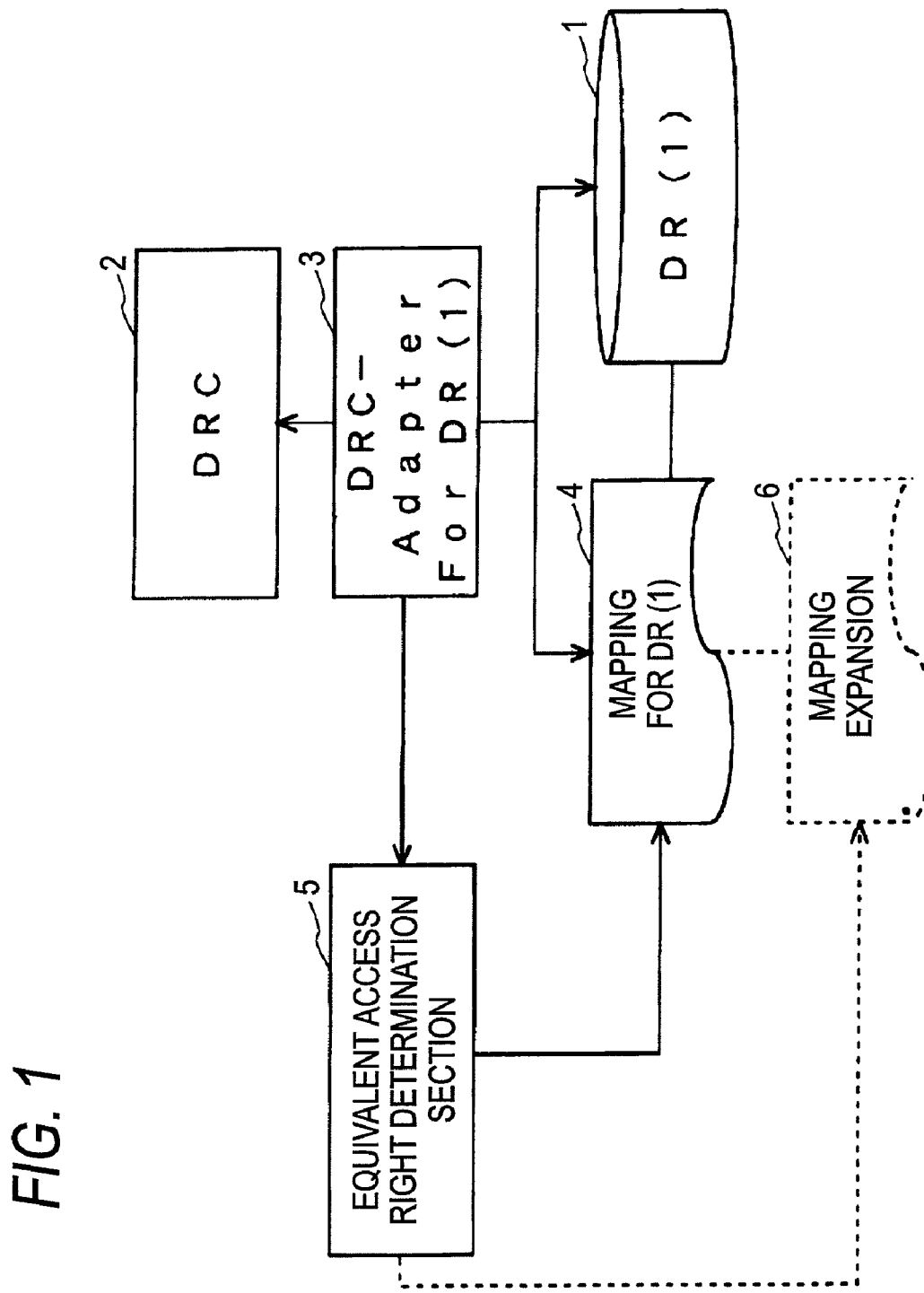
FIG. 1 is a drawing to illustrate function blocks of a data processing system according to one exemplary embodiment of the invention.

FIG. 1 illustrates function blocks of the data processing system according to the exemplary embodiment of the invention. The data processing system in the example has DR 1, DRC 2, DRC-Adapters 3, mapping storage sections 4, and an equivalent access right determination section 5. In the description to follow, the data processing system including plural of DRs 1 is taken as an example, but the invention may also be applied to the data processing system including one DR 1.

The DR 1 is a document management system for storing and managing electronic data and the access right to the electronic data. The data processing system in the example includes plural of DRs 1 like DR (1), DR (2), . . . , but DR (1) is shown as a representative in FIG. 1.

The DRC 2 is intervened between an operation main body (operator, system, etc.,) for giving an operation command to electronic data managed in each DR 1 and each DR 1 and is a component for providing an operation interface (API) made common about different types of DRs 1 for the operation main body. The DRC 2 also provides SPI for DRC-Adapter.

The DRC-Adapter 3 implements the function stipulated in API of DRC 2 using API of each DR 1 for a subcomponent implementing SPI of DRC 2 and access right mapping. The data processing system in the example includes plural of DRC-Adapters 3 for each DR 1 like DRC-Adapter For DR (1), DRC-Adapter For DR (2), . . . , but DRC-Adapter For DR (1) is shown as a representative in FIG. 1.

The mapping storage section 4 stores correspondence information indicating the correspondence (mapping) between the common access right systemized in DRC 2 and the access right systemized uniquely in each DR 1 (unique access right). Each DRC-Adapter 3 sets and acquires the access right (common access right) in DRC 2 based on the correspondence information. The data processing system in the example includes mapping storage sections 4 for each DR 1 like mapping for DR (1), mapping for DR (2), . . . , but mapping for DR (1) is shown as a representative in FIG. 1.

Such a configuration enables the operation main body for giving an operation command to electronic data to operate electronic data, set the access right, etc., using the common operation interface provided by DRC 2 without considering the characteristic, etc., of DR 1 for managing electronic data to be operated and real data (perpetuation data) of the access right.

Although not shown in FIG. 1, the data processing system in the example is also provided with function sections of a request acceptance section, an access right setting processing section, etc.

The request acceptance section accepts an access right set request specifying the common access right (access right of DRC 2) to electronic data, entered using an input device of a mouse, a keyboard, etc., by a set requester. The request acceptance section in the example is realized by DRC 2. The access right set request contains ACL information containing the identifier of electronic data to which the access right is to be set and an access right set (a pair of the identifier of the access right to be set and the identifier of the person or the system given the access right) set for the electronic data as parameters. In the example, the request acceptance section is realized using the function of DRC 2.

When the request acceptance section accepts an access right set request, the access right setting processing section performs access right setting processing of setting the unique access right (access right of DR1) corresponding to the common access right (access right of DR2) specified in the access right set request for the corresponding DR 1 based on the correspondence information stored in the mapping storage section 4 for DR 1 for managing the target electronic data. In the example, processing of converting the common access right in ACL contained in the access right set request into the unique access right and storing the unique access right in DR 1 is performed.

When the request acceptance section accepts an access right set request, before the access right setting processing of the access right setting processing section, the equivalent access right determination section 5 determines whether or not the request is a non-match request wherein a different access right having the relationship of the equivalent access right with the common access right specified in the access right set request exists (namely, correspondence with the common access right not specified in the access right set request for the unique access right corresponding to the common access right specified in the access right set request exists) is determined based on the correspondence information stored in the mapping storage section 4 for DR 1 for managing the target electronic data.

The equivalent access right determination section 5 is included, whereby if the access right set request is a non-match request, it is made possible to perform processing different from usual access right setting.

In the data processing system in the example, if the access right set request is not a non-match request, the access right setting processing section executes the access right setting processing and outputs the result to the setting requester; if the access right set request is a non-match request, the access right setting processing of the access right setting processing section is stopped and the fact is output to the setting requester. If the access right set request is a non-match request, access right setting processing may be executed and a message to the effect that the request is a non-match request may be output to the setting requester so that the setting requester is caused to recognize a state in which contradictory access right setting is made.

Figure 2:
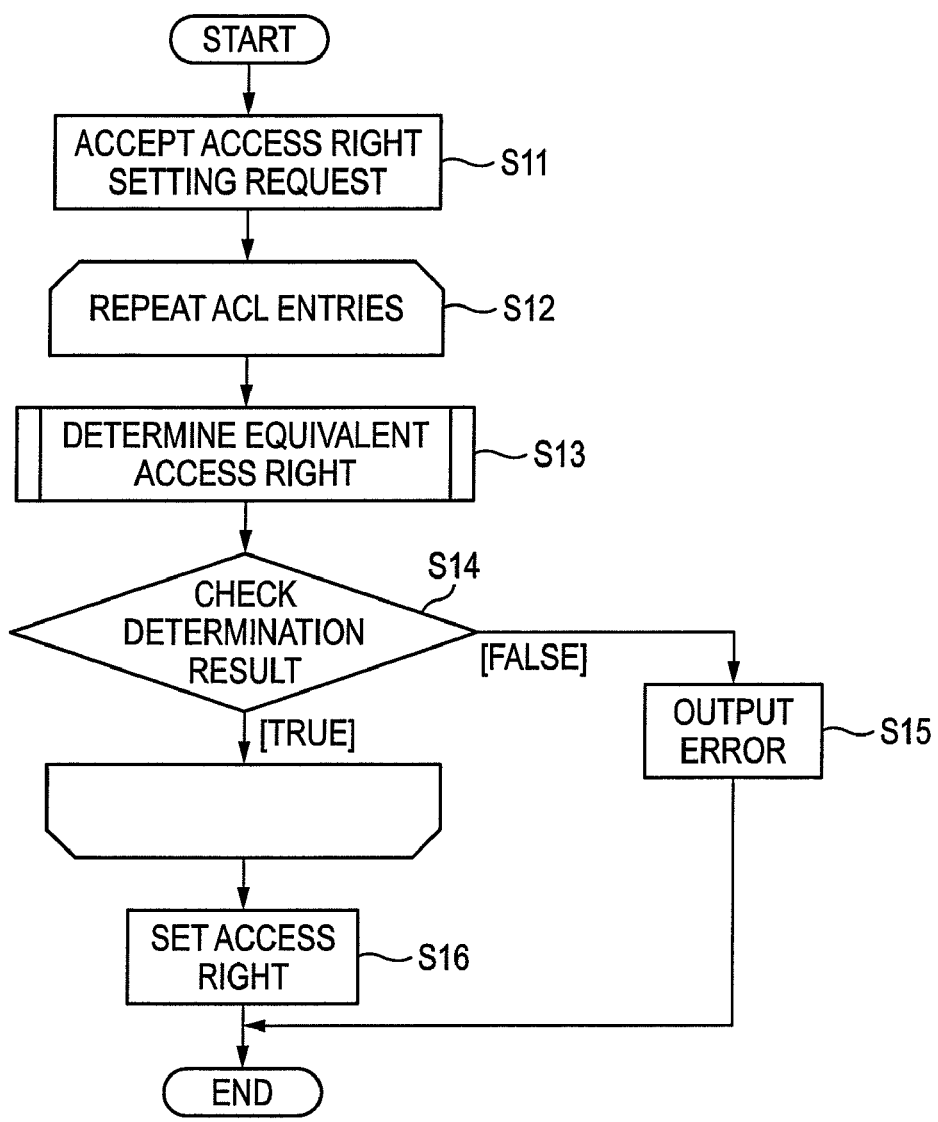
FIG. 2 is a flowchart to illustrate a processing flow of access right setting in the data processing system according to the exemplary embodiment of the invention.

FIG. 2 illustrates a processing flow of access right setting in the data processing system in the example.

[Step S11] DRC 2 (request acceptance section) accepts an access right setting request to electronic data. The access right set request contains ACL information containing the identifier of electronic data to which the access right is to be set and an access right set (a pair of the identifier of the access right to be set (common access right) and the identifier of the person or the system given the access right) set for the electronic data as parameters. In the example, the request acceptance section is realized using the function of DRC 2.

[Step S12] Equivalent access right determination (step S13) is repeated for all entries of the ACL information received at step S11.

[Step S13] In the equivalent access right determination, whether or not the access right in the target entry is appropriate (valid) is determined (described later in detail). In the example, two values of true if the access right in the target entry is appropriate (valid) and false if the access right is inappropriate (invalid) are returned as the determination result. In addition to the mode of returning the determination result in two values, if the access right is inappropriate, a set of different equivalent access right to be set together with the access right in the target entry may be returned (if the access right is valid, null may be returned).

[Step S14] Processing is switched based on the result of the equivalent access right determination (step S13). If the determination result is appropriate (true), the process goes to determination of the next entry (step S13) and if the determination result is inappropriate (false), the process goes to step S15.

[Step S15] An error is returned as a non-match request in which specification lacks specification of equivalent access right (specification description is contradictory). If a set of different equivalent access rights rather than false is returned, the set of different equivalent access rights may be contained in the error.

[Step S16] If it is determined that all are appropriate as the result of executing the determination (step S13) about all entries of the ACL information received at step S11, the unique access right (access right of DR 1) corresponding to the common access right (access right of DRC 2) in the ACL information is acquired from the mapping storage section 4 and is set for the DR 1.

Figure 3:
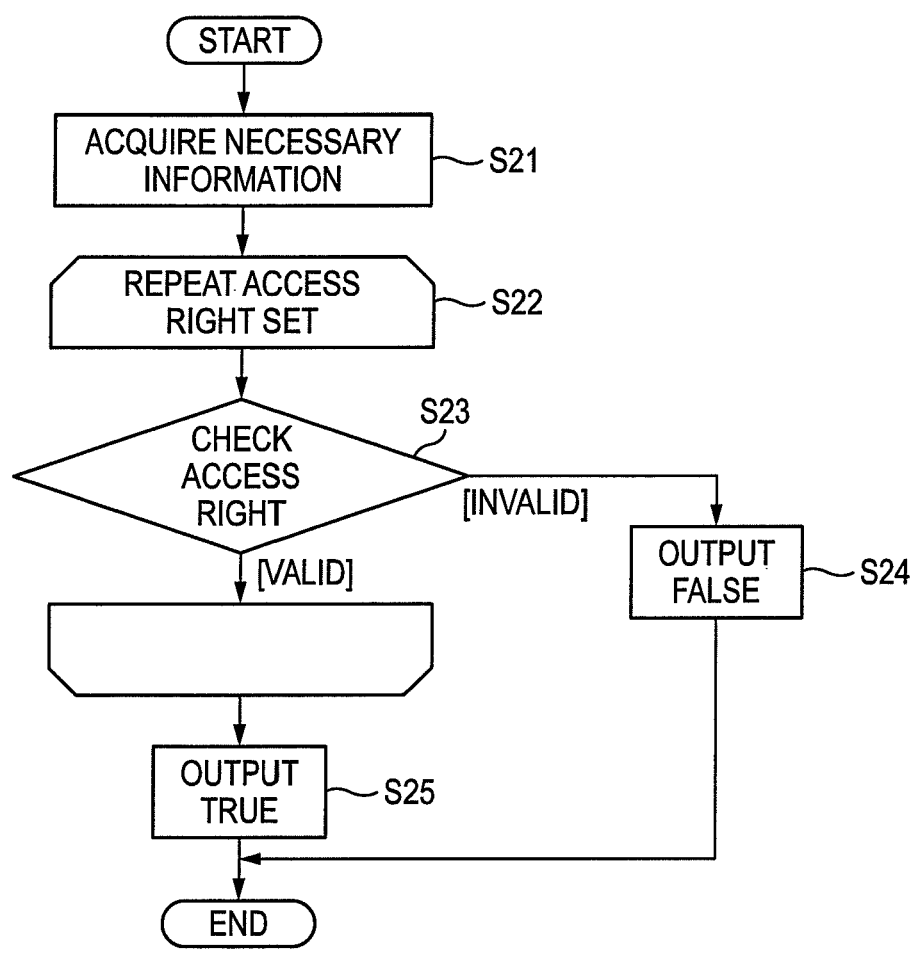
FIG. 3 is a flowchart to illustrate a processing flow of equivalent access right determination in the data processing system according to the exemplary embodiment of the invention.

FIG. 3 illustrates the detail of a processing flow of the equivalent access right determination (step S13) in the access right setting.

[Step S21] Information required for executing equivalent access right determination is acquired. As the necessary information, an access right set of DRC 2 that the setting requester desires to set and mapping of the access right of DRC 2 and the access right of DR 1 (correspondence information read from the mapping storage section 4) are named. In the description to follow, the former is called DRC-Permissions and the latter is simply called mapping.

[Step S22] Access right check (step S23) is repeated for each element of DRC-Permissions acquired at step S21 (common access right; called DRC-Permission).

In the access right check, whether or not all of equivalent access rights of DRC-Permission are contained in DRC-Permissions (whether or not unspecified equivalent access right exists) is checked. Specifically, the access right (unique access right; called DR-Permission) on DR 1 corresponding to DRC-Permission is acquired from mapping, the equivalent access right set is acquired based on the DR-Permission, and a comparison is made between the acquired equivalent access right set and DRC-Permissions. Basically, if all of the equivalent access right set is contained in DRC-Permissions, the process goes to determination of the next element (DRC-Permission); if not all is contained, the process goes to S24.

For example, if both access rights A and B of DRC 2 are mapped in access right C of DR 1 and DRC-Permissions is A and check is made about A, the equivalent access right set is A and B and DRC-Permissions do not contain B and thus the process goes to step S24.

When the process goes to determination of the next element (DRC-Permission), It is self-evident that the equivalent access right of DRC-Permission determined this time is contained in DRC-Permissions and thus determination about another DRC-permission in DRC-Permissions (namely, equivalent access right) may be skipped.

[Step 24] It is determined that the access right in the target entry is inappropriate (specification lacks specification of equivalent access right), false is returned. In the example, only the determination result is returned, but a set of insufficient equivalent access right may be returned.

[Step 25] If the access right check (step S23) about each element (DRC-Permission) of DRC-Permissions normally terminates, true is returned.

Figure 4:
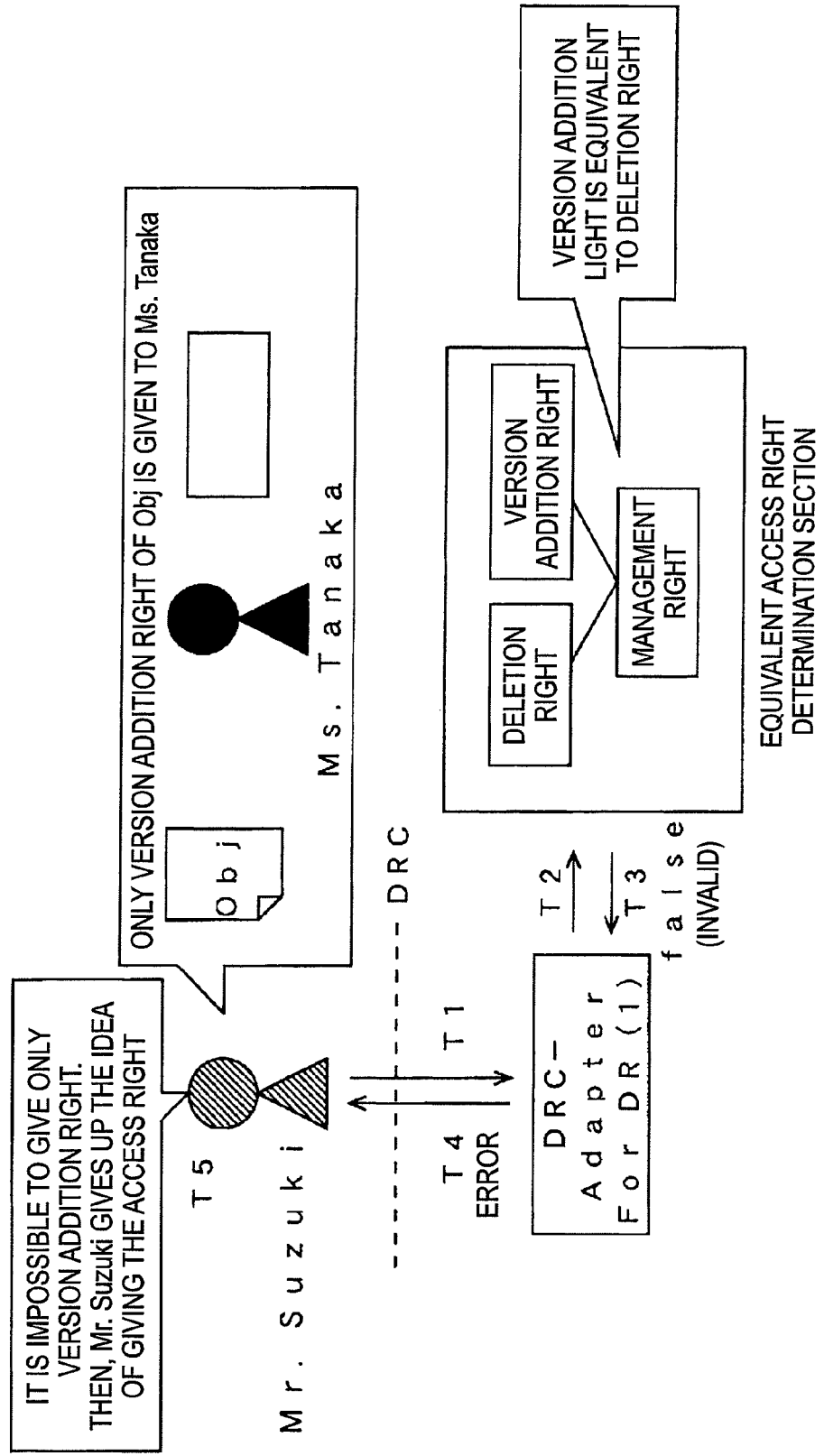
FIG. 4 is a drawing to describe access right setting in the data processing system according to the exemplary embodiment of the invention.
Figure 7:
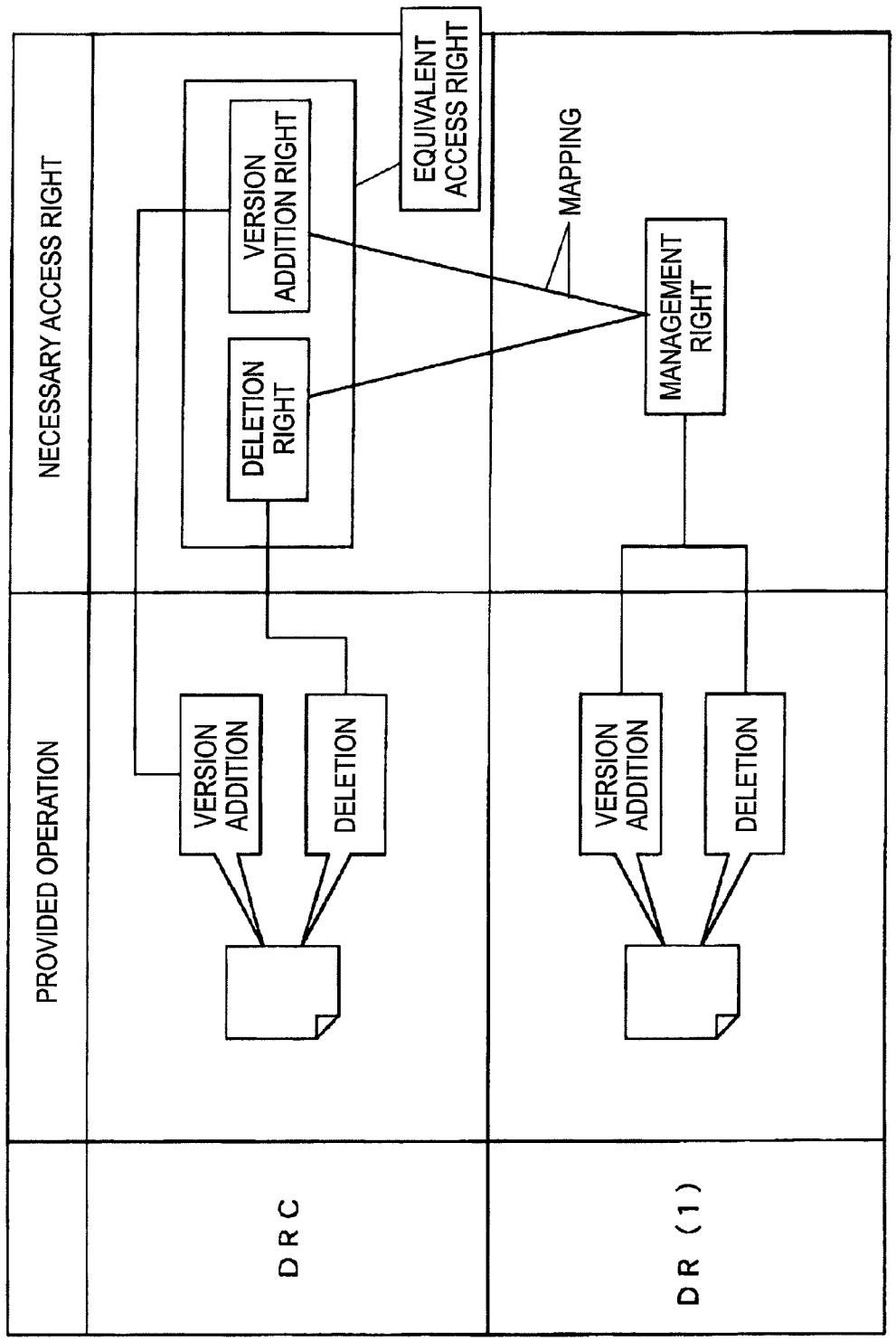
FIG. 7 is a drawing to illustrate the relationship between the access right in DRC and the access right in DR.

Access right setting in the data processing system in the example will be discussed with reference to FIG. 4 about the correspondence between access rights illustrated in FIG. 7.

[Step T1] Mr. Suzuki issues a request for giving only the version addition right to object obj to Ms. Tanaka through DCR 2.

[Step T2] DRC-Adapter 3 receiving the request entrusts determination of equivalent access rights to the equivalent access right determination section 5.

[Step T3] The equivalent access right determination section 5 first determines the equivalent access right of the specified DRC 2 access right (common access right). In the example, the DR 1 access right (unique access right) corresponding to the version addition right is the management right and the DR1 management right is also mapped from the DRC 2 deletion right and thus and the version addition right and the deletion right become equivalent access rights. When the equivalent access rights are determined, then whether or not both the version addition right and the deletion right are contained in the access right set to be set is checked. In the example, only the version addition right is contained and thus it is determined that the check result is inappropriate and false is returned. A set of equivalent access rights (here, deletion right and version addition right) to be set together with the access right requested for setting rather than false may be returned.

[Step T4] If it is determined at step T3 that the check result is inappropriate, DRC-Adapter (1) 3 returns an error. Accordingly, setting of the deletion light is not made implicitly. A set of equivalent access rights to be set together with the access right requested for setting may be set in the error.

[Step S5] Since an error is returned, Mr. Suzuki may recognize that it is impossible to give only the version addition right. As the later step to be taken, for example, both the deletion right and the version addition right are given or if it is impossible to give only the version addition right, Mr. Suzuki gives up the idea of giving the access right or the like.

Next, the configuration of expanding the data processing system in the example will be discussed.

The data processing system in the configuration example further includes a mapping expansion section 6 as indicated by a dashed line in FIG. 1.

The mapping expansion section 6 stores rank information defining the rank about common access rights (DRC 2 access rights) having the relation of equivalent access rights. The equivalent access right determination section 5 checks whether or not high-order equivalent access right not specified in an access right setting request exists for the unique access right (DR1 access right) corresponding to the common access right (DRC 2 access right) specified in the access right setting request based on the rank of the equivalent access rights according to the rank information stored in the mapping expansion section 6 and then if high-order equivalent access right not specified in the access right setting request exists, the equivalent access right determination section 5 determines that the access right setting request is a non-match request; otherwise, the equivalent access right determination section 5 determines that the access right setting request is not a non-match request.

Thus, lower-rank equivalent access right than the common access right to be set need not specified explicitly in the access right setting request.

The equivalent access right determination in the configuration example will be discussed with reference to FIG. 3. The processing except access right check (step S23) is the same as the processing described above and therefore will not be discussed again.

[Step S23'] In the access right check, whether or not higher-rank equivalent access rights than the equivalent access right of DRC-Permission are all contained in DRC-Permissions (high-order unspecified equivalent access right exists) is checked. Specifically, access right on DR (DR-Permission) corresponding to DRC-Permission is acquired from mapping, an equivalent access right set is acquired based on the DR-Permission, and a comparison is made between the acquired equivalent access right set and DRC-Permissions. If higher-order rights than target DR-Permission in the equivalent access right set are all contained in DRC-Permissions, the process goes to determination of the next element (DRC-Permission); if not all is contained, the process goes to S24.

That is, for example, if the deletion right is higher-order than the version addition right, when only the deletion right is specified, the specification is determined to be appropriate; whereas, only the version addition right is specified, the specification is determined to be inappropriate.

Figure 5:
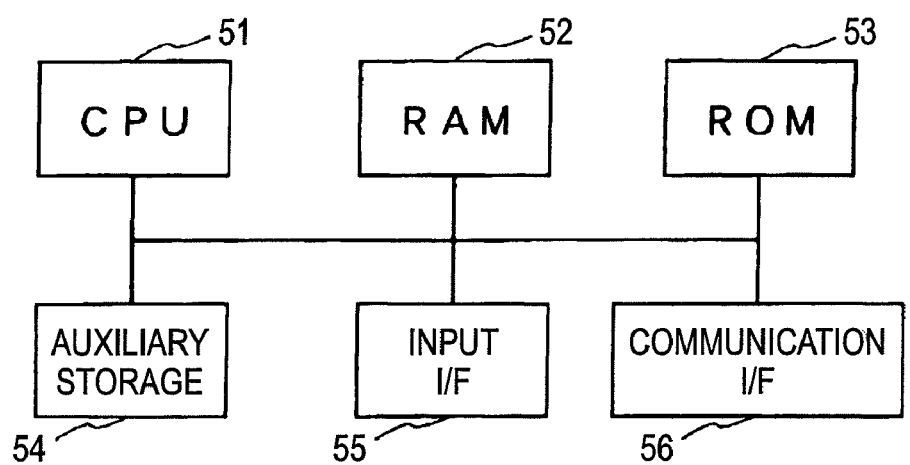
FIG. 5 is a block diagram to illustrate the hardware configuration of an access right management apparatus in the data processing system according to the exemplary embodiment of the invention.
Figure 6:
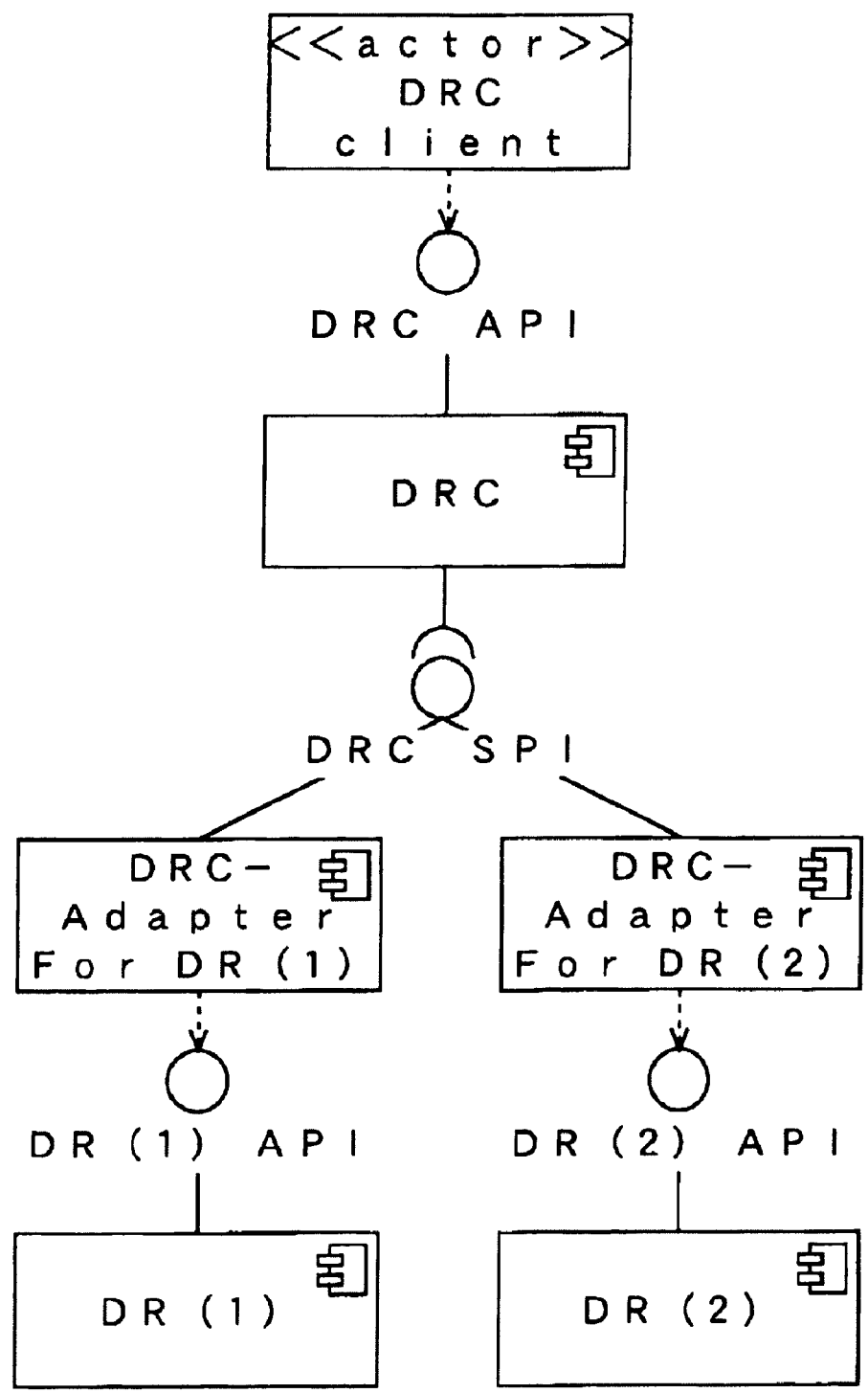
FIG. 6 is a drawing to illustrate the relationship between DRC and its relevant component in a document processing system.

FIG. 5 shows main hardware in a computer provided in the data processing system according to the example.

In the example, the system is implemented as a computer having hardware resources of a CPU 51 for performing various types of computation processing, main memory of RAM 52 used as a work area of the CPU 51, ROM 53 recording a basic control program, etc., auxiliary storage 54 for storing programs and various pieces of data according to the exemplary embodiment of the invention (for example, a magnetic disk of HDD, etc., rewritable nonvolatile memory of flash memory, etc., or the like), an input/output I/F 55 of an interface with a display for displaying various pieces of information and input devices of operation buttons, a touch panel, etc., used for input operation by an operator, a communication I/F 56 of an interface for communicating with another apparatus in a wired or wireless manner, and the like.

The program according to the exemplary embodiment of the invention is read from the auxiliary storage 54, etc., is expanded in the RAM 52, and is executed by the CPU 51, whereby the function of an access right management apparatus according to the exemplary embodiment of the invention is realized on the computer.

In the data processing system in the example, the function sections are distributed to plural of computers, but may be provided in one computer.

The program according to the exemplary embodiment of the invention, for example, is read from an external storage medium of CD-ROM, etc., storing the program or is received through a communication line, etc., whereby the program is set in the computer according to the example.

The function sections need not necessarily be implemented as software as in the example and each function section may be implemented as a dedicated hardware module.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A non-transitory computer readable medium storing a program causing a computer to execute a process for an access right management, the process comprising:

reading correspondence information from a storage unit for storing correspondence information indicating the correspondence between (i) a unique access right of an access right in a data management unit for managing electronic data and the access right to the electronic data and (ii) a common access right of an access right in an interface providing unit intervening between an operation main body for giving an operation command to the electronic data and the data management unit, the common access right providing an operation interface made common about different types of the data management unit for the operation main body;

accepting a setting request for requesting setting of the common access right; and determining whether or not the setting request of the common access right accepted by the accepting is a non-match request wherein correspondence with a different common access right exists for the unique access right corresponding to that the common access right based on the correspondence information read by the reading, wherein in correspondence between one unique access right and a plurality of common access rights, the common access rights are ranked, and wherein when correspondence with a higher-order different common access right than a common access right requested for setting exists for the unique access right corresponding to the common access right, the determining determines that the request for the setting is a non-match request.

2. The non-transitory computer readable medium according to claim 1 further comprising:

canceling setting of the common access right based on a setting request determined to be a non-match request by the determining.

3. The non-transitory computer readable medium according to claim 1 further comprising:

outputting a determination result of the determining to a requester of the setting request.

4. The non-transitory computer readable medium according to claim 3 wherein if it is determined that the setting request of the common access right accepted by the accepting is a non-match request, the outputting outputs information indicating the different common access right corresponding to the unique access right relating to the setting request.

5. An access right management apparatus including:

a correspondence read unit that reads correspondence information from a storage unit for storing correspondence information indicating the correspondence between a unique access right of an access right in a data management unit and a common access right of an access right in an interface providing unit as for the data management unit for managing electronic data and the access right to the electronic data and the interface providing unit intervening between an operation main body for giving an operation command to the electronic data and the data management unit for providing an operation interface made common about different types of the data management unit for the operation main body;

a request acceptance unit that accepts a setting request for requesting setting of the common access right; and a determination unit that determines whether or not the setting request of the common access right accepted by the request acceptance unit is a non-match request wherein correspondence with a different common access right exists for the unique access right corresponding to that the common access right based on the correspondence information read by the correspondence read unit, wherein in correspondence between one unique access right and a plurality of common access rights, the common access rights are ranked, and wherein when correspondence with a higher-order different common access right than a common access right requested for setting exists for the unique access right corresponding to the common access right, the determination unit determines that the request for the setting is a non-match request.

6. The access right management apparatus according to claim 5 further comprising:

a canceling unit that canceling setting of the common access right based on a setting request determined to be a non-match request by the determination unit.

7. The access right management apparatus according to claim 5 further comprising:

an output unit that outputting a determination result of the determination unit to a requester of the setting request.

8. The access right management apparatus according to claim 7 wherein if it is determined that the setting request of the common access right accepted by the accepting is a non-match request, the outputting outputs information indicating the different common access right corresponding to the unique access right relating to the setting request.

9. Data processing system comprising:

a data management unit that manages electronic data and the access right to the electronic data;

an interface providing unit that intervenes between an operation main body for giving an operation command to the electronic data and the data management unit for providing an operation interface made common about different types of the data management unit for the operation main body;

a storage unit that stores correspondence information indicating the correspondence between a unique access right of an access right in the data management unit and a common access right of an access right in the interface providing unit;

a request acceptance unit that accepting a setting request for requesting setting of the common access right; and a determination unit that determines whether or not the setting request of the common access right accepted by the request acceptance unit is a non-match request wherein correspondence with a different common access right exists for the unique access right corresponding to that the common access right based on the correspondence information stored in the storage unit, wherein in correspondence between one unique access right and a plurality of common access rights, the common access rights are ranked, and wherein when correspondence with a higher-order different common access right than a common access right requested for setting exists for the unique access right corresponding to the common access right, the determination unit determines that the request for the setting is a non-match request.

* * * * *